United States Patent [19]
Chen

[11] Patent Number: 5,687,004
[45] Date of Patent: Nov. 11, 1997

[54] APPARATUS FOR SCANNERS SYSTEM HAVING AN INFRARED RAY SOURCE

[75] Inventor: Donald Chen, Ping-Chen, Taiwan

[73] Assignee: Must Systems Inc., Hsin-Chu, Taiwan

[21] Appl. No.: 644,458

[22] Filed: May 10, 1996

[51] Int. Cl.[6] .................... H04N 1/028; H04N 1/04
[52] U.S. Cl. .................... 358/445; 358/446; 358/461; 358/474; 358/483
[58] Field of Search .................... 358/471, 474, 358/475, 482, 483, 480, 484, 494, 496, 497, 445, 446, 461, 443; 250/208.1, 205; 348/370

[56] References Cited

U.S. PATENT DOCUMENTS

| | | | |
|---|---|---|---|
| 4,987,499 | 1/1991 | Kimura | 358/474 |
| 5,446,276 | 8/1995 | Iyoda et al. | 250/208.1 |
| 5,467,403 | 11/1995 | Fishbine et al. | |

*Primary Examiner*—Scott A. Rogers
*Attorney, Agent, or Firm*—Merchant, Gould, Smith, Edell, Welter & Schmidt, P.A.

[57] ABSTRACT

The present invention is an apparatus for scanner system having an infrared ray source, and this scanner system can be utilized in a region where there is lack of visible light. The present invention includes an infrared ray source, a mirror, a lens set, a filter, a charge couple device (CCD), a pro-processing means, an analogue to digital converter, and a post-processing means.

3 Claims, 1 Drawing Sheet

APPARATUS FOR SCANNERS SYSTEM HAVING AN INFRARED RAY SOURCE

FIELD OF THE INVENTION

The present invention relates to a scanner system, and more specifically, to a scanner system having an infrared ray source.

BACKGROUND OF THE INVENTION

A scanner system makes use of focusing a reflecting light beam through a photodetector to generate an image signal for further image prosessing. A conventional scanner system includes a light source 10, a mirror 11, and a lens set 12, which are used to guide the reflecting light to a charge couple device (CCD) 13; a charge couple device 13 is utilized to generate an image signal; a pre-processing means 14 is used to respond an image signal and adjust dc gain of the image signal; an analogue to digital converter 16 is used to convert adjusted image signal to a digital signal and a post-processing means 16 to generat an image code by processing said digital signal through highlight, shadow, and Gamma correction.

A functional block diagram of a typical scanner is illustrated in FIG. 1. In practicing this system, light source 10 is reflected from the surface of a document, then it is reflected against from the mirror 11 and focused by a lens set 12. The mirror 11 and the lens set 22 are used to guide the light beam to a CCD 13. Subsequently, the light beam is converted to an image signal by the CCD 13, and direct current (d.c.) gain of the image signal is adjusted by a pre-processing means 14, i.e. a d.c. gain voltage amplifier 14. Then the adjusted image is fed to an analogue to digital converter (ADC) 15 for converting adjusted image signal to a digital signal. After that the digital signal is fed to a post-processing means 16 to generat an image code by processing the digital signal through highlight, shadow, and Gamma correction.

Unfortunately, the conventional scanner system can only be operated under visible light.

SUMMARY OF THE INVENTION

It is an object of the present invention to provide a scanner system having an infrared ray source.

It is another object of the present invention to provide a scanner system which can be operated normally without visible light.

The present invention includes an infrared ray source, a mirror and a lens set are used to guide the reflection infrared ray to a filter and to a charge couple device (CCD). The filter is set for the purpose of filtering out the infrared ray whose wavelength cannot be detected by the CCD. The charge couple device is utilized to generate an image signal, a pre-processing means is used to respond an image signal and adjust dc gain of the image signal, an analogue to digital converter is utilized to convert adjusted image signal to a digital signal, and a post-processing means to generate an image code.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
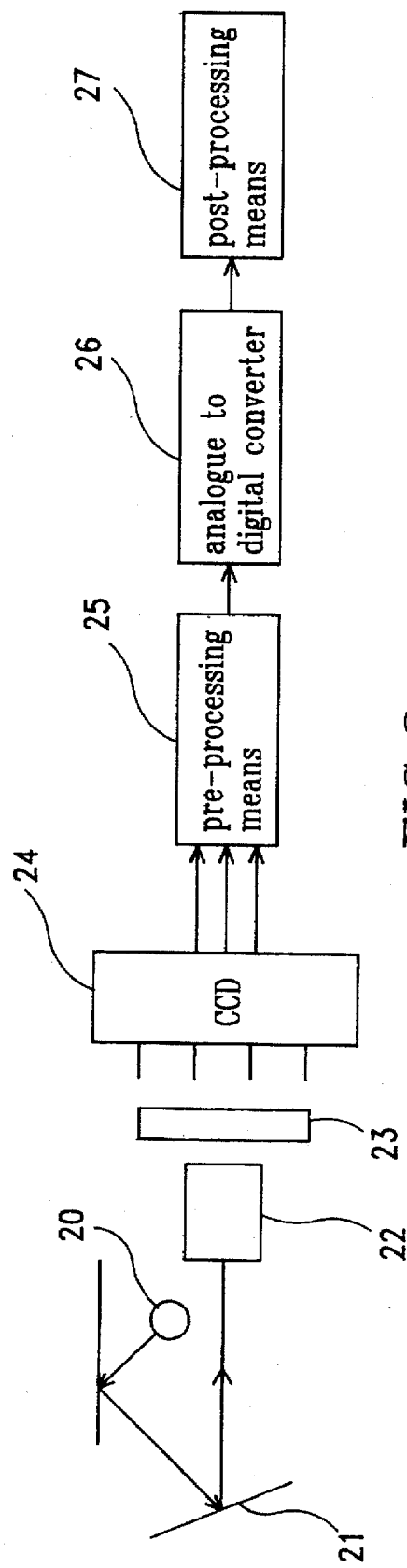
FIG. 2 is a functional block diagram of the present invention.

Referring to FIG. 2, the present invention includes an infrared ray source 20, which will be reflected against from the surface of a document, a mirror 21 and a lens set 22 are used to guide the reflection infrared my to a charge couple device (CCD) 24. The charge couple device 24 is utilized to generate an image signal; a pre-processing means 25 is used to respond an image signal and adjust dc gain of the image signal; an analog to digital converter 26 is utilized to convert adjusted image signal to a digital signal; and a post-processing means 27 is utilized to generate an image code.

Figure 1:
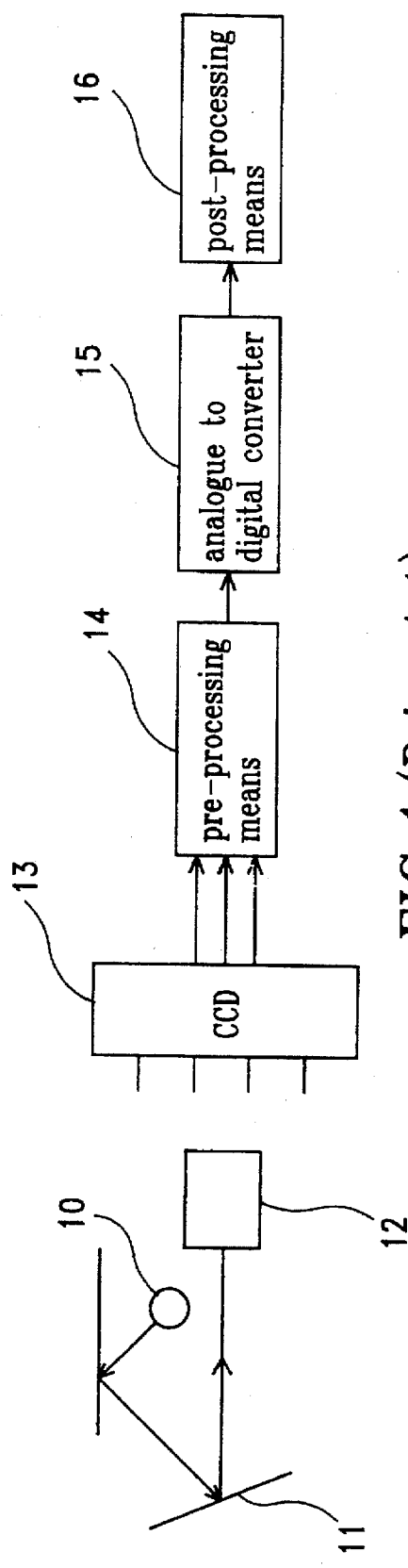
FIG. 1 is a functional block diagram of the conventional scanner system.

A functional block diagram of typical scanner is illustrated in FIG. 1. In practicing this system, the infrared ray some 20 is reflected against from the surface of a document. Then it is reflected against from the mirror 21 and focused by a lens set 12. The mirror 11 and the lens set 22 are used to guide the infrared ray to a CCD 24. A filter 23 is set before the CCD 24 to filter out the infrared my whose wavelength cannot be detected by the CCD 24. Subsequently, the infrared ray is converted to an image signal by the CCD 24, and d.c. gain of the image signal is adjusted by a pre-processing means 25, i.e. a d.c. gain voltage amplifier 25. Then the image signal is fed to an analogue to digital converter (ADC) 26 to convert adjusted image signal to a digital signal. After that the digital signal is fed to a post-processing means 27 to generate an image code by processing the digital signal through highlight, shadow, and Gamma correction. Then the image code is fed to a buffer for further image processing or displaying.

In the preferred embodiment, the wavelength of the infrared ray 20 is greater than 800 nm. The filter 23 can filter out the infrared ray whose wavelength is greater than 1000 nm and less than 800 nm. The present invention can be operated normally in a region where there is lack of visible light. In addition, the light source of this scanner is infrared ray so that the chassis of the scanner having a window for alignment is not necessary and the chassis of the scanner is opaque, which will reduce the cost of the system.

As is understood by a person skilled in the art, the foregoing preferred embodiment of the present invention are illustrated of the present invention rather than limiting of the present invention. It is intended to cover various modifications and similar arrangements included within the spirit and scope of the appended claims, the scope of which should he accorded the broadest interpretation so as to encompass all such modifications and similar structure.

What is claimed is:

1. An apparatus for an optic scanner having an infrared ray source to scan an image on a document, said apparatus comprising:

the infrared ray source having a wavelength that is greater than 800 nm for serving as a light source of said scanner to illuminate infrared ray to said document, said infrared ray being reflected against from a surface of said document;

an image sensor responsive to said reflected infrared ray for generating an image signal;

focusing means set in said scanner for focusing and guiding said reflected infrared ray to said image sensor:

a filter set between said document and said image sensor for filtering out a wavelength of said reflected infrared ray that cannot be detected by said image sensor said filter filtering out the wavelength that is less than 800 nm;

reflecting means for guiding said reflected infrared ray to said focusing means;

pre-processing means responsive to said image signal for adjusting dc (direct current) gain of said image signal;

an analogue to digital converter responsive to said adjusted image signal for converting said adjusted image signal to a digital signal; and post-processing means responsive to said digital signal for generating an image code by processing said digital signal through highlight, shadow, and Gamma correction.

2. The apparatus of claim 1, wherein the wavelength of said infrared ray filtered out by said filter is greater than 1000 nm and less than 800 nm.

3. The apparatus of claim 1, further comprising an opaque chassis.

* * * * *